United States Patent [19]
Kolvites et al.

[11] Patent Number: 5,483,916
[45] Date of Patent: Jan. 16, 1996

[54] FLAG DISPLAY DEVICE

[75] Inventors: Albert Kolvites, Mountaintop; Robert J. Cohn, Dallas; Paul J. Angeloni, Jessup, all of Pa.

[73] Assignee: A. Rifkin Co., Wilkes-Barre, Pa.

[21] Appl. No.: 233,587

[22] Filed: Apr. 26, 1994

[51] Int. Cl.$^6$ .............................. G09F 17/00; G09F 7/00; F16M 13/00
[52] U.S. Cl. ................ 116/173; 116/28 R; 116/DIG. 24; 248/205.7; 248/514; 40/597
[58] Field of Search ...................... 116/28 R, 30, 116/63 R, 63 P, 63 T, 209, 173–175, DIG. 16, DIG. 24; 40/589, 591, 592, 597, 588, 593, 606, 607; 248/514, 538, 291, 284, 184, 185, 205.5, 205.7, 362, 363, 537, 205.6, 205.8, 205.9, 206.1–206.4; 403/84, 103, 119, 83, 289, 290

[56] References Cited

U.S. PATENT DOCUMENTS

| | | | |
|---|---|---|---|
| 952,495 | 3/1910 | Austin | 116/DIG. 24 |
| 1,466,961 | 9/1923 | Prim | 248/205.7 |
| 2,277,981 | 3/1942 | Horton . | |
| 3,081,054 | 3/1963 | Westervelt . | |
| 3,148,856 | 9/1964 | Orlando . | |
| 3,280,790 | 10/1966 | Booth . | |
| 3,320,920 | 5/1967 | Lusebrink . | |
| 3,686,938 | 8/1972 | Binckley . | |
| 3,861,635 | 11/1975 | Juris | 248/284 |
| 4,052,697 | 10/1977 | Daifotes | 116/28 R |
| 4,122,796 | 10/1978 | Pressler et al. | 116/28 R |
| 4,590,883 | 5/1986 | Steed et al. . | |
| 4,640,213 | 2/1987 | Lugo | 116/28 R |
| 4,920,910 | 5/1990 | Lin | 116/173 |
| 5,042,418 | 8/1991 | Hoover et al. . | |
| 5,133,524 | 7/1992 | Liu | 248/363 |
| 5,233,938 | 8/1993 | Lalo | 248/539 |
| 5,356,102 | 10/1994 | Blumenaus | 248/205.5 |

FOREIGN PATENT DOCUMENTS 0462586 3/1937 United Kingdom .

*Primary Examiner*—William A. Cuchlinski, Jr.
*Assistant Examiner*—Andrew Hirshfeld
*Attorney, Agent, or Firm*—Panitch Schwarze Jacobs & Nadel

[57] ABSTRACT

A flag display device for mounting a flag or pennant to the exterior surface of a vehicle, such as a windshield, window, or roof includes a flag staff having a flag affixed at one end and an annular base member at the opposite end. A suction cup depends from the base member for securing the flag display device to the surface. The base member also has a plurality of flexible legs radially extending from the annular ring to the surface which engage the surface at individual, separate and distinctly spaced contact points adjacent an outer perimeter of the suction cup when the suction cup is depressed, so that a force applied to the flag staff is transferred to the surface through the individual leg contact points and the suction cup and the flag staff remains stable even when wind forces are applied to the flag and flag staff. The flag display device further includes a mounting member for securing the flag staff to the base member. The mounting member provides an adjustment mechanism for adjusting a position of the flag staff relative to the base member.

11 Claims, 3 Drawing Sheets

FLAG DISPLAY DEVICE

FIELD OF THE INVENTION

The present invention relates to a device for mounting a flag or pennant on a surface, and more particularly, to an inexpensive flag display device for releasably and securely mounting a flag on a surface.

BACKGROUND OF THE INVENTION

Flag display devices which allow a flag or pennant to be removably secured to a vehicle are well known. Commonly, these flag display devices provide a flag secured to one end of a staff, and a suction cup secured to the opposite end of the staff. While the gripping power of the suction cup is sufficient, the forces exerted on the flag due to wind as the vehicle travels cause the flag and the flag staff to wobble and shake. Thus, conventional flag display devices have not provided the flag with sufficient stability.

In order to overcome this problem, various other means and improvements for securing the flag display device to the vehicle surface have been proposed. For instance, one flag display device provides a magnet arranged over a suction cup to maintain the suction cup in sealing relation with a surface, while another flag display device provides a plurality of suction cups arranged around a base member.

While these flag display devices are better at remaining securely attached to a vehicle surface and stabilizing the flag staff even during high speeds, they have proven to be too costly. More particularly, such flag display devices are typically used as funeral flags on vehicles in funeral processions. After the services are complete the funeral home personnel have to walk around to all the vehicles collecting the flag display devices. Nevertheless some vehicles will depart with the flag display device still attached to the vehicle either during the service or after the service if funeral home personnel were not available. As such, the funeral home has to absorb the cost of such flag display devices. Hence, a need has arisen for an inexpensive flag display device which securely, but yet removably, secures a flag to a surface and stabilizes the flag staff.

One attempt to develop an inexpensive flag display device which remains securely attached to the vehicle surface and stabilizes the flag staff, has been to provide a small circular hub having a plurality of rigid arms extending outwardly therefrom. The distal ends of adjacent arms are connected by a rigid annular support member. The flag staff passes through the hub and into engagement with a boss on a suction cup. When the suction cup is applied to a surface, the annular member engages the surface in order to prevent movement of the flag staff.

However, this flag display device fails to maintain adequate adhesion with the vehicle surface or fails to stabilize the flag staff and flag during relatively high speeds because the annular member and arms are relatively rigid. More particularly, when a suction cup is applied to a surface it is pressed downwardly to the point where the under side or bottom of the suction cup is in substantial facing engagement with the surface. The suction cup is then released and it moves upwardly to create a vacuum pocket between the suction cup and the surface. Depending upon the relative position of the rigid annular member with respect to the bottom surface of the suction cup, the annular member will prevent either the bottom of the suction cup from achieving substantial facing engagement with the surface, in which case the suction cup will not completely adhere to the surface or when the suction cup moves upwardly the rigid annular member will separate from the surface resulting in a loss of stability for the flag staff.

The present invention is an inexpensive flag display device which is removably and securely affixed to a surface and supports the flag in a stabilized manner. The flag display device is removably securable to a surface by a suction cup. The flag display device provides a base member interconnecting a flag staff and the suction cup. The base member has a plurality of radially extending generally flexible legs for engaging the surface at individual, spaced contact points adjacent an outer perimeter of the suction cup. The present invention overcomes the problems with the aforementioned flag display devices. Thus, the present invention solves the need for an inexpensive flag display device which securely, but yet removably, secures a flag to a surface and maintains the flag in a stabilized manner.

SUMMARY OF THE INVENTION

Briefly stated, the present invention is directed to a flag display device for mounting a flag on a surface comprising a flag staff having a first end and a second end. The flag is affixed adjacent to the flag staff first end. A base member is secured to the flag staff second end and includes a plurality of generally flexible legs radially extending therefrom. A suction cup depends from the base member for gripping the surface. When the suction cup is gripping the surface, the legs engage the surface at individual, separate and distinctly spaced contact points adjacent an outer perimeter of the suction cup. Thus, when a force is applied to the flag staff, it is transferred to the surface through the individual contact points and the suction cup.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangement and instrumentality shown. In the drawings.

DETAILED DESCRIPTION OF PREFERRED EMBODIMENTS

Figure 1:
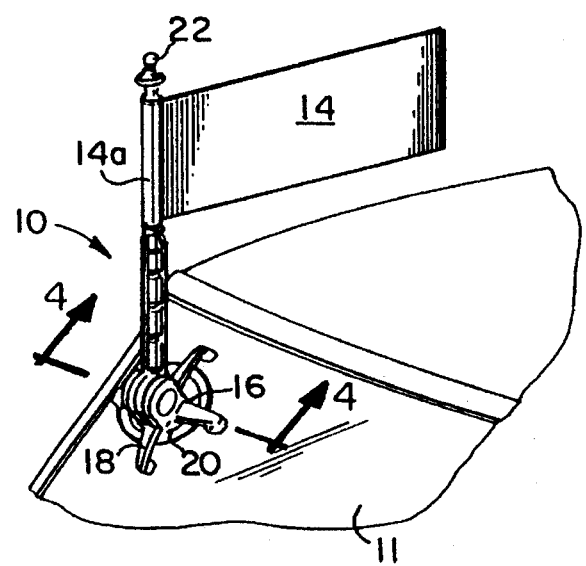
FIG. 1 is a perspective view of a flag display device on a vehicle windshield according to a preferred embodiment of the invention.

Referring now to the drawings in detail, wherein like numerals indicate like elements throughout, there is shown in FIGS. 1 through 5 a presently preferred embodiment of a flag display device, indicated generally at 10, for mounting a flag 14 on a surface 11. As shown in FIG. 1, the flag display device 10 (hereafter "device 10") may be mounted on a surface 11 that is smooth and generally planar, such as the windshield of a vehicle. Although the device 10 is shown mounted to the vehicle windshield, it is understood by those skilled in the art from this disclosure that the device 10 may also be mounted to the trunk, hood, roof, or any other vehicle surface. It is also understood by those skilled in the art from this disclosure that the present invention is not limited to mounting the device 10 to any particular surface.

Figure 2:
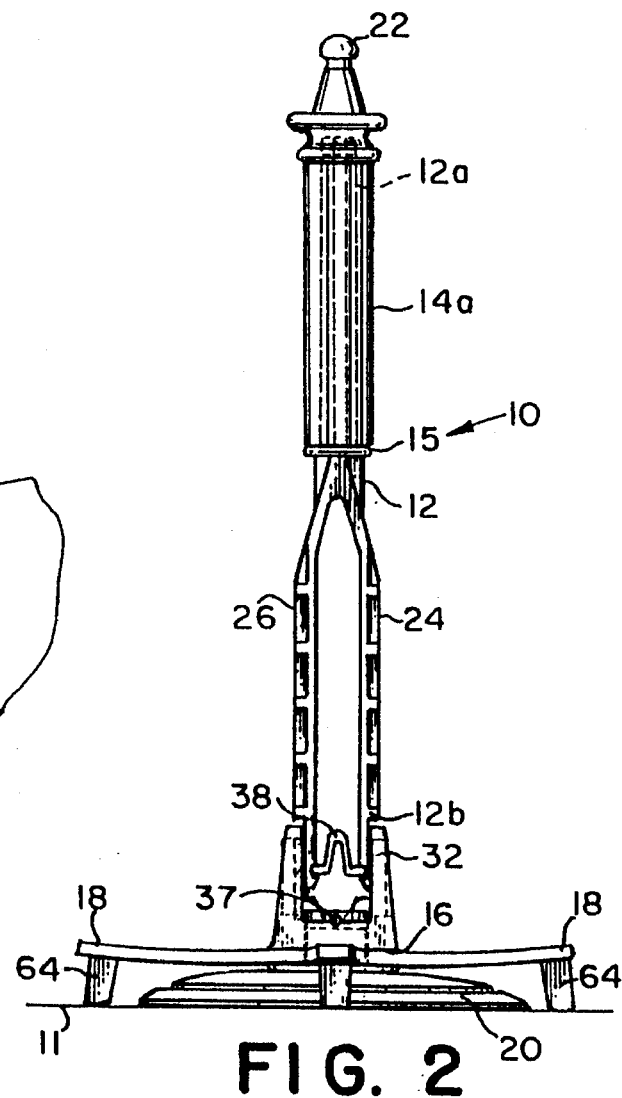
FIG. 2 is an enlarged front elevational view of the flag display device shown in FIG. 1.
Figure 3:
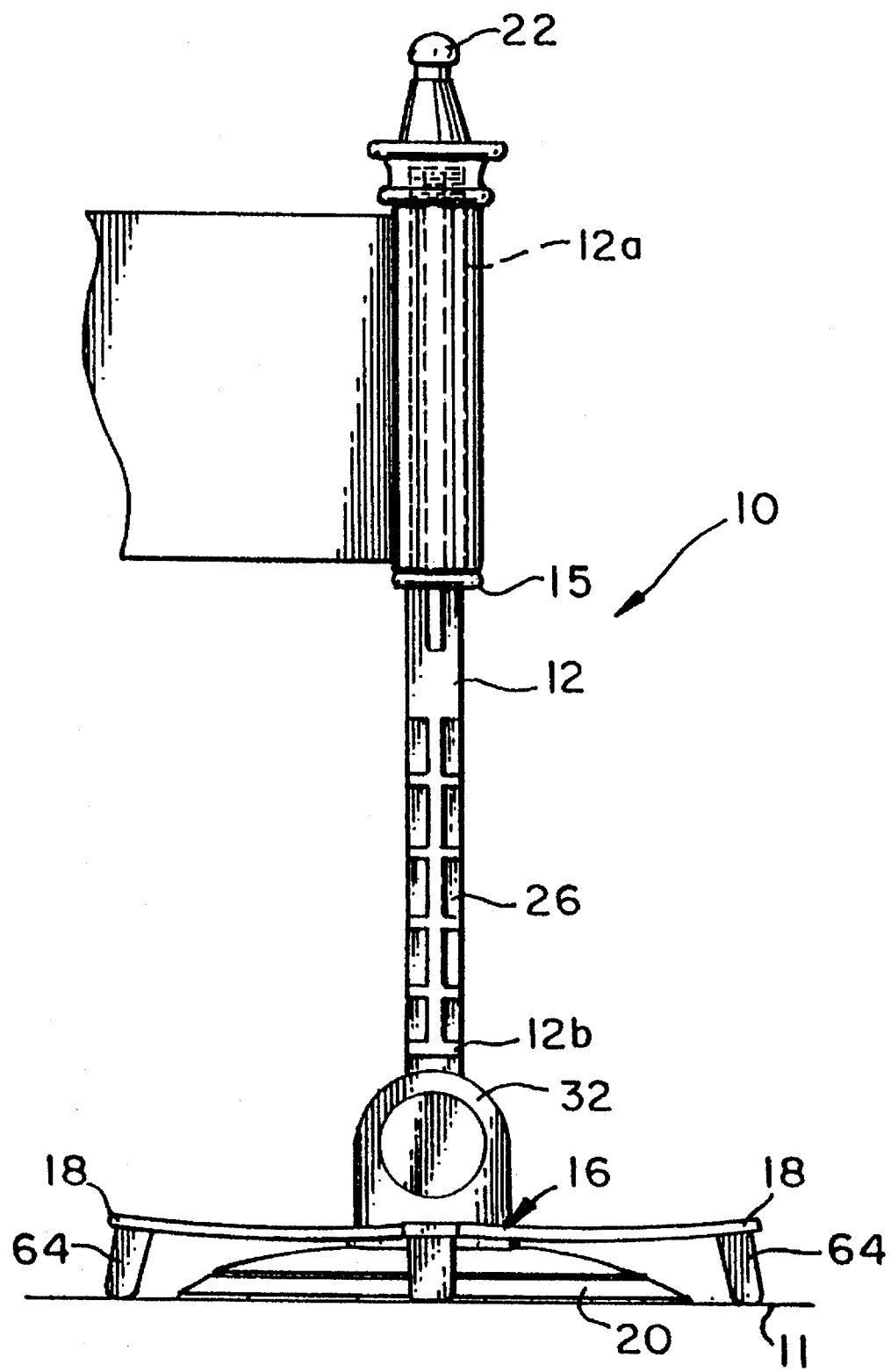
FIG. 3 is an enlarged partial side elevational view of the flag display device shown in FIG. 1.

Referring now to FIGS. 2 and 3, the flag display device 10 comprises a flag staff 12, the flag 14, a base member 16 having a plurality of legs 18 extending radially outwardly therefrom for contact with the surface 11, and a suction cup 20 depending from the base member 16 for gripping the surface 11. As shown in FIG. 2, the flag staff 12 has a first end 12a and a second end 12b. In the preferred embodiment, the flag staff 12 is generally in the form of an upside down Y. The first end 12a is the single end of the Y, and the second end 12b is the double end of the Y, such that the second end 12b has first and second legs 24, 26, respectively. However, it is understood by those of ordinary skill in the art from this disclosure that the flag staff 12 could be configured in other manners. For instance, the flag staff 12 could be made from a single rod which is not Y-shaped.

In the preferred embodiment, the flag staff 12 is made from a strong, light and durable material which is able to withstand various weather conditions, wind forces, and rays from the sun, such as a polycarbonate material and treated with ultra-violet inhibitors. However, it is understood by those of ordinary skill in the art from this disclosure that other materials with similar characteristics could be used, such as other polymeric materials, metal or wood.

In the present embodiment, it is preferred that the flag staff 12 be constructed of a molding process, such as injection molding. However, it is understood by those of ordinary skill in the art from this disclosure that other molding processes could be used to construct the flag staff 12, such as casting and transfer molding, without departing from the spirit and scope of the invention.

In the present embodiment, the flag staff 12 includes a decorative finial 22 fitted to the flag staff first end 12a. The finial 22 is preferably threadably secured to the first end 12a of the flag staff 12 in a manner well understood by those of ordinary skill in the art. However, it is also understood by those of ordinary skill in the art from this disclosure that the finial 22 could be secured to the first end 12a in other manners, such as by an adhesive, or the finial 22 could be omitted from the device 10 without departing from the spirit and scope of the invention.

Referring now to FIGS. 1 and 2, the flag 14 is affixed adjacent to the flag staff first end 12a. In the preferred embodiment, the flag 14 is slidably disposed on the flag staff 12 adjacent the flag staff first end 12a. This allows the flag 14 to rotate or turn on the flag staff 12. More particularly, the proximal end 14a of the flag 14 is formed generally in the form of a tube which is annular in cross section and sized to complementarily and rotatably receive the first end 12a of the flag staff 12. The flag 14 is maintained on the first end 12a of the flag staff 12 by the finial 22 and is prevented from moving axially towards the second end 12b of the flag staff 12 by a radially extending flange 15.

It is understood by those of ordinary skill in the art from this disclosure that various other methods of affixing the flag 14 to the flag staff 12 are suitable, such as tying the flag 14 to the flag staff 12, using hooks, rings or grommets and other fasteners, as well as making the flag 14 integral to the flag staff 12. Moreover, it is not required that the flag 14 be able to rotate on the flag staff 12. The flag 14 could be in fixed relation to the flag staff 12 without departing from the spirit and scope of the invention.

Referring now to FIGS. 1 and 3, the flag 14 is sized and shaped so that it is easily discernible and readily visible by persons when secured to an unobstructed surface, yet not so large as to be an unpleasant distraction. In the present embodiment the flag 14 is preferably configured to be generally rectangular in plan view. However, it is understood by those of ordinary skill in the art from this disclosure that the flag 14 can be of various sizes and shapes, such as triangular. Further, the flag 14 can be used as a decorative, or to display messages or slogans. In the preferred embodiment, the flag 14 includes lettering (not shown) to designate vehicles in a funeral procession. The messages or slogans may be engraved, silk-screened, sewn, imprinted or otherwise displayed on the flag 14. In the preferred embodiment, the message is engraved on both sides of the flag 14 so that it is visible by persons from more than one viewing direction.

The flag 14 is constructed from a durable material which is able to withstand strong wind forces, rain, cold, sleet, snow and sunlight. In the preferred embodiment, the flag is constructed from a high impact styrene material with ultra-violet inhibitors. However, it is understood by those of ordinary skill in the art from this disclosure that other materials also suitable for displaying messages and withstanding weather can be used, such as paper, cloth, polymers, leather or the like material. Although a particular flag 14 has been described, it should be understood by those skilled in the art from this disclosure, that the present invention can be used to display other forms of flags or objects. For instance, three-dimensional shapes and structures, such as a simulated golf ball (not shown), could also be affixed to the flag staff 12.

Figure 4:
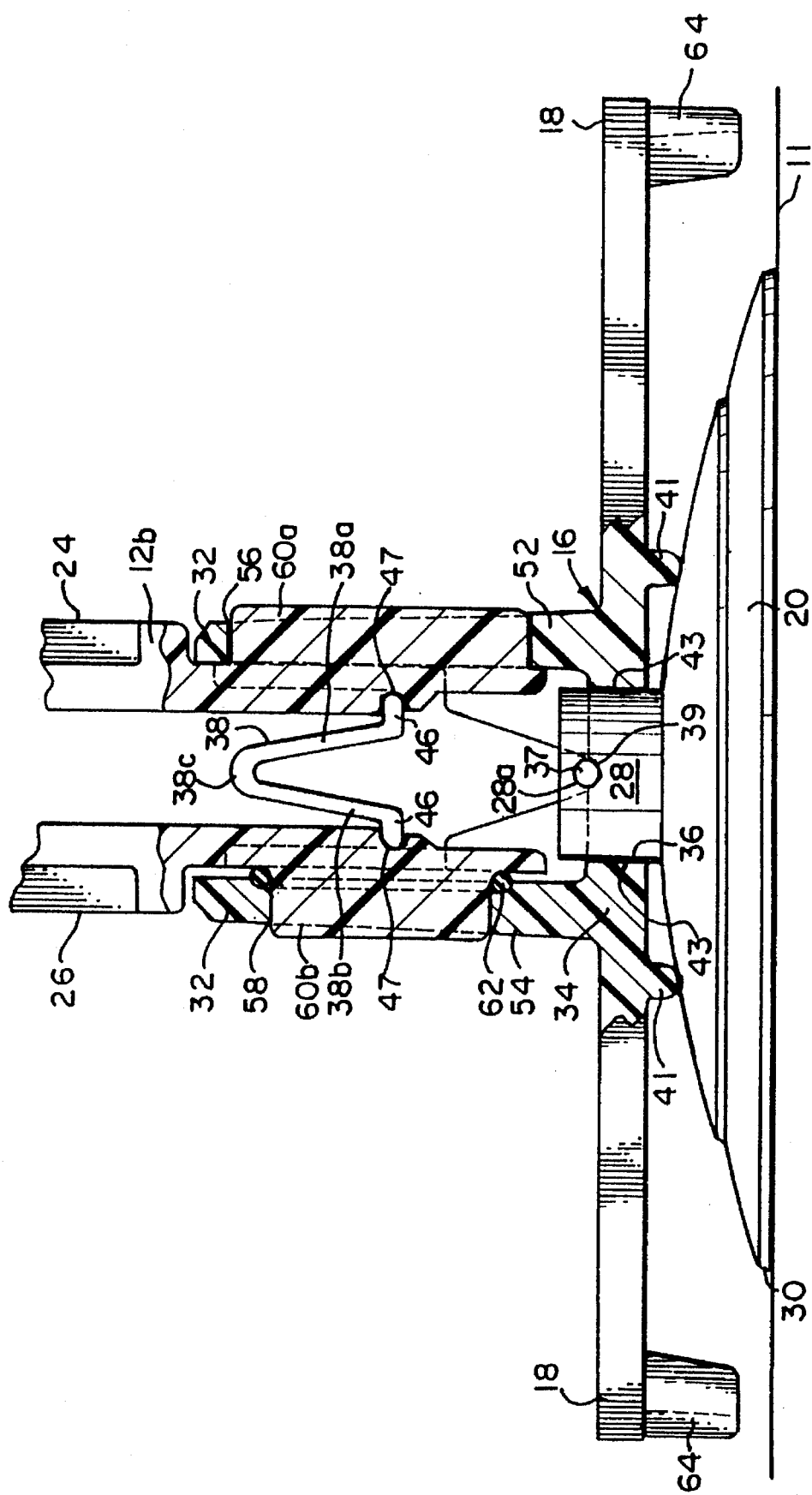
FIG. 4 is a greatly enlarged front elevational view, partially in cross-section, of the flag display device shown in FIG. 1 taken along line 4—4 of FIG. 1.

Referring now to FIG. 4, the base member 16 is secured to the flag staff second end 12b and includes a plurality of legs 18 extending therefrom. In the preferred embodiment, the base member 16 comprises an annular ring 34, with the plurality of legs 18 integral therewith and radially extending outwardly therefrom. The annular ring 34 has a generally circular opening 36 extending through its center. The opening 36 is sized to complementarily receive a head 28 on the suction cup 20. The head 28 extends completely through the opening 36 beyond the upper surface of the annular ring 34 and includes a bore 28a extending transversely through the head 28. A locking pin 37 is positioned within the bore 28a and extends radially beyond the circumference of the head 28 on both sides of the head 28. The portions (not shown) of the pin 37 extending radially beyond the head 28 are located within a groove 39 in the upper surface of the annular ring 34 to secure the suction cup 20 to the base member 16 and prevent the suction cup 20 from rotating with respect to the base member 16.

A downwardly extending generally annular rib 41 surrounds the opening 36 and is in engagement with the upper surface of the suction cup 20 to provide the base member 16 with rigidity. An adhesive 43, such as a cyanoacrylate-type adhesive, is disposed between the head 28 and the surface which forms the opening 36 in the annular ring 34 to further prevent the suction cup 20 from rotating with respect to the base member 16. It is understood by those skilled in the art that the suction cup 20 could be adhesively secured to the base member 16 in other manners. For instance, a flexible hot melt glue (not shown) could be disposed between the upper surface of the suction cup 20, the lower surface of the annular ring 34 and the annular rib 41 to further prevent the suction cup 20 from rotating with respect to the base member 16.

Although the currently preferred embodiment uses a locking pin 37 and adhesive 43 to secure the suction cup 20 to the base member 16, it is understood by those of ordinary skill in the art from this disclosure that alternative methods of securing the suction cup 20 and base member 16 together could be used. For instance, the suction cup 20 could be secured to the base member 16 with a friction fit and adhesive combination (not shown) without departing from the spirit and scope of the invention.

As shown in FIG. 4, the suction cup 20 is generally dome shaped and includes an outer perimeter 30. The head 28 extends upwardly from the upper surface of the suction cup 20. The suction cup 20 is sized such that the distal ends of the legs 18 are located adjacent the outer perimeter 30. Suction cups are generally known and are available in a wide variety of sizes. Various size suction cups can be used to practice the present invention, with the size being dependant upon the available area within the contact points of legs 18, among other things, the length of the flag staff 12 and the size and weight of the flag 14 depending therefrom.

The suction cup 20 forms a vacuum seal when depressed, thus securely holding the device 10 to the surface 11. The suction cup 20 may also include a small release tab (not shown) on the outer perimeter 30 to aid in breaking the vacuum seal and removing the device 10 after it has been placed in sealing contact with a surface 11. Since suction cups of the type used in the presently preferred embodiment are generally known, well understood by those of ordinary skill in the art and widely commercially available, further description of the suction cup 20 is omitted and is not limiting.

Referring now to FIGS. 2 and 4, as previously stated, the flag staff 12 is generally in the form of an upside down Y. The first and second legs 24 and 26 of the second end 12b of the flag staff 12 are designed to be secured within a mounting member 32 interposed between the base member 16 and the flag staff second end 12b, to secure the flag staff second end 12b to the base member 16. The mounting member 32 includes a first side section 52 and a second side section 54 extending upwardly from the annular ring 34. The mounting member 32 and the first and second legs 24, 26 together comprise an adjustment mechanism for pivotably adjusting or positioning the flag staff 12 at an angle relative to the base member 16. The first and second side sections 52, 54 include generally circular openings 56 and 58, which respectively receive complementary disk shaped members 60a, 60b which are respectively affixed to an outer side of the first and second legs 24, 26. The disk members 60a, 60b act in concert with the openings 56, 58, and allow the flag staff 12 to be pivotably adjusted and set at an angle with respect to the base member 16, as described in more detail below.

In the presently preferred embodiment, the mounting member 32 is formed as an integral part of the base member 16. However, it should be apparent to one skilled in the art that the mounting member 32 could be a separate piece which is affixed to the base member 16 (not shown).

An upside down V-shaped spring element 38 (FIG. 4) extends between the first leg 24 and the second leg 26. The V-shaped spring element 38 includes first and second extensions 38a, 38b extending from the apex 38c of the spring element 38. Each extension 38a, 38b includes an outwardly extending tab 46 at its distal end which is received within a notch 47 of the first and second legs 24, 26 to securely maintain the spring element 38 between the first and second legs 24, 26. More particularly, when the flag staff 12 is manufactured, the disk members 60a, 60b are preferably closely juxtaposed to permit the disk members 60a, 60b to be readily positioned between the first and second side sections 52, 54. After the disk members 60a, 60b are positioned between the first and second side sections 52, 54 in alignment with the openings 56, 58, the spring element 38 is positioned between the first and second legs 24, 26 to bias the disk members 60a, 60b outwardly into the openings 54, 56 and engagement with the first and second side sections 52, 54, respectively.

In the present embodiment, it is preferred that the spring element 38 be constructed of a material which is capable of biasing the first and second legs 24, 26 of the second end of the flag staff 12b outwardly into engagement with the first and second side sections 52, 54, such as a polycarbonate material. However, it is understood by those skilled in the art that the spring element 38 could be constructed of other materials, such as spring steel without departing from the spirit and scope of the invention.

The adjustment mechanism further includes a friction element 62 placed between the second leg 26 of the flag staff second end 12b and the second side section 54 to assist in holding the flag staff 12 and base member 16 at a fixed position. In the present embodiment, as shown in FIG. 4, the friction element 62 is a neoprene O-ring positioned between the second side section 54 and the second disk member 60b. The spring element 38 maintains the second disk member 60b in contact with the friction element 62. Thus, if the device 10 is placed on an angled surface, such as the surface 11 of a vehicle windshield shown in FIG. 1, the position of the flag staff 12 may be adjusted relative to the base member 16. This allows the flag staff 12 to be placed in a vertical position independent of the relative angle of the surface 11 upon which the device 10 is affixed.

Although the presently preferred embodiment of the invention uses an O-ring in conjunction with second disk member 60b and second side section 54, it is understood by those skilled in the art from this disclosure that other adjustment mechanisms are possible, such as a locking ratchet teeth mechanism (not shown), to enable the device 10 to be adjusted with respect to a surface 11.

Referring now to FIGS. 2 and 3, the plurality of legs 18 extend radially outwardly from the base member 16 for contact with the surface 11 so that when the suction cup 20 is gripping the surface 11, the legs 18 engage the surface 11 at individual, separate and distinctly spaced contact points adjacent the outer perimeter 30 of the suction cup 20. The legs 18 have feet 64 at their distal ends. The feet 64 extend generally perpendicularly from the legs 18 towards and into contact with the surface 11. In the preferred embodiment, the base member 16 includes four legs 18 extending radially outwardly therefrom. However, it is within the spirit and scope of the invention to have a different number of legs extend from the base member 16, such as three or five.

Figure 5:
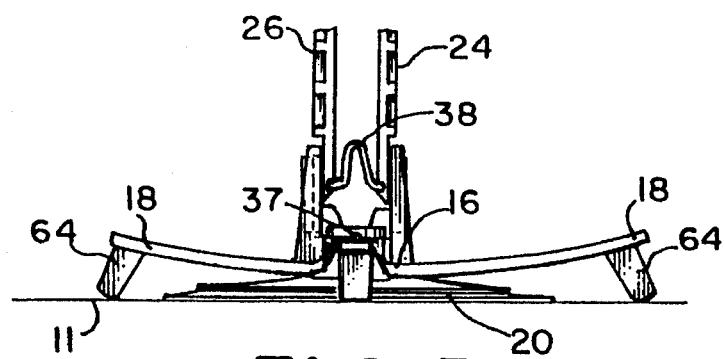
FIG. 5 is an enlarged partial front elevational view of the flag display device shown in FIG. 1 during the mounting process.

Referring now to FIG. 5, the legs 18 are made of a generally flexible material such that the legs 18 flex or bend like a leaf spring when the suction cup 20 is placed or pressed into sealing contact with the surface 11. The legs 18 flex as the suction cup 20 is depressed, thus allowing for a strong and secure seal. Yet, the flexibility of the legs 18 is limited so that the legs 18 provide adequate stability when forces are exerted on the device 10. More particularly, the legs 18, the base member 16 and the mounting member 32 are preferably made of the same material and in the same manner as the flag staff 12. In the presently preferred embodiment the legs project radially outwardly away from the annular ring 34 in a relatively straight manner. It is understood by those of ordinary skill in the art from this disclosure that the legs 18 could be arcuate or include a bend and still provide the desired contact point between the device 10 and the surface 11 without compromising the seal of the suction cup 20 and providing adequate stability when forces are applied to the flag 14 and the flag staff 12.

In use, the surface 11 should be relatively clean and smooth. The device 10 is then placed over the surface 11 with the suction cup 20 in facing engagement with the surface 11 and the feet 64 slightly spaced from the surface 11, as shown in FIG. 4. A downward force is then applied to the device 10 to cause the suction cup 20 to flex and grasp the surface 11, and cause the legs 18 to flex and bend, as shown in FIG. 5. Because the legs 18 flex, the under side or bottom of the suction cup 20 is in substantial facing engagement with the surface 11 when the initial downward force is applied. The downward force is then released and the suction cup 20 moves upwardly, creating a vacuum pocket (not shown) between the suction cup 20 and the surface 11 to thereby secure the suction cup 20 to the surface 11. As the suction cup 20 moves upwardly, the legs 18 begin to unbend as shown in FIGS. 2 and 3, but do not return to the normal unflexed orientation shown in FIG. 4. In this manner, the legs 18 are partially flexed to stabilize the flag staff 12 and provide a plurality of individual, spaced contact points between the device 10 and the surface 11. At this time, the device 10 is securely attached to the surface 11 and the user can grasp the flag staff 12 and move it to a desired position or angular orientation (usually vertical).

When a force, such as the force due to wind, is applied to the flag 14 or flag staff 12, the force is transferred to the surface 11 through the semi-flexed legs 18 to the individual contact points and the suction cup 20. Since the legs 18 are flexible, the suction cup 20 is permitted to completely adhere to the surface 20 and the legs 18 are in tension when they are in contact with the surface 11 to maintain the stability of the flag staff 12.

From the foregoing description, it can be seen that the preferred embodiment of the invention comprises a device for use on a surface which is operative to display a flag or pennant. The device 10 exhibits excellent adhesion and force transfer characteristics, so that the flag staff 12 remains stable even when forces are exerted on the flag 14 and/or flag staff 12, such as wind forces. Further, the device 10 can be easily and efficiently manufactured. It will be appreciated that changes and modifications may be made to the above described embodiments without departing from the inventive concept thereof. Therefore, it is understood that the present invention is not limited to the particular embodiment disclosed, but is intended to include all modifications and changes which are within the scope and spirit of the invention as defined by the appended claims.

We claim:

1. A flag display device for mounting a flag on a surface comprising:

a flag staff having a first end and a second end, the flag being affixed adjacent to the flag staff first end;

a base member comprising an annular ring having a plurality of generally flexible legs radially extending therefrom and a downwardly extending rib, the legs of the annular ring having feet at their distal ends, the feet extending substantially perpendicularly from the legs of the annular ring, towards the surface;

a suction cup depending from the base member for gripping the surface such that when the suction cup is gripping the surface the feet engage the surface at individual, separate and distinctly spaced contact points adjacent an outer perimeter of the suction cup and the base member downwardly extending rib engages an upper surface of the suction cup to provide the base member with rigidity; and an adjustment mechanism comprising a mounting member securing the flag staff second end to the base member, the adjustment mechanism for adjusting a position of the flag staff relative to the base member, whereby a force applied to the flag staff is transferred to the surface through the individual contact points and the suction cup.

2. A flag display device for mounting a flag on a surface comprising:

a base member comprising an annular ring having a plurality of legs radially extending therefrom and a downwardly extending rib, the legs having feet at their distal ends, the feet extending substantially perpendicularly from the legs towards the surface;

a suction cup depending from the base member for gripping the surface such that when the suction cup is gripping the surface the feet engage the surface at individual, separate and distinctly spaced contact points adjacent an outer perimeter of the suction cup and the base member downwardly extending rib engages an upper surface of the suction cup to provide the base member with rigidity;

a Y-shaped flag staff having a first end and a second end, the second end having a first leg with a first disk shaped member and a second leg with a second disk shaped member, the flag being affixed adjacent to the flag staff first end; and an adjustment mechanism comprising a mounting member integral with the base member for securing the disk shaped members of the flag staff second end to the base member, the adjustment mechanism for adjusting a position of the flag staff relative to the base member, whereby a force applied to the flag staff is transferred to the surface through the individual contact points and the suction cup.

3. The flag display device according to claim 2 wherein the legs of the flag staff second end are biased into engagement with the mounting member by a spring.

4. The flag display device according to claim 2 wherein the plurality of legs of the annular ring comprises four legs.

5. The flag display device according to claim 4 wherein the legs of the annular ring are made of a flexible material.

6. A flag display device for mounting a flag on a surface comprising:

a Y-shaped flag staff having a first end and a second end, the second end having a first leg with a first disk shaped member and a second leg with a second disk shaped member, the flag being affixed adjacent to the flag staff first end;

a base member secured to the flag staff second end including a plurality of generally flexible legs radially extending therefrom and a downwardly extending rib;

a mounting member integral with the base member and having two side sections, each side section having an opening therein for respectively receiving the first and second disk shaped members, of the first and second legs of the flag staff second end, wherein the disk shaped members are rotatable within said openings such that the flag staff is adjustable with respect to the base member; and a suction cup depending from the base member for gripping the surface such that when the suction cup is gripping the surface the plurality of legs of the base member engage the surface at individual, separate and distinctly spaced contact points adjacent an outer perimeter of the suction cup and the base member downwardly extending rib engages an upper surface of the suction cup to provide the base member with rigidity, whereby a force applied to the flag staff is transferred to the surface through the individual contact points and the suction cup.

7. The flag display device of claim 6 wherein the base member comprises an annular ring, the plurality of legs of the base member radially extending therefrom.

8. The flag display device according to claim 6 wherein the legs of the base member have feet at their distal ends, the feet extending substantially perpendicularly from the legs of the base member, towards the surface.

9. The flag display device according to claim 6 wherein the plurality of legs of the base member comprises four legs.

10. The flag display device according to claim 6 wherein the legs of the flag staff second end are biased into engagement with the mounting member by a spring.

11. The flag display device according to claim 10 further comprising a friction element located between the second leg of the flag staff and the side section within which the second disk shaped member is located, said friction element for holding the flag staff with respect to the base member.

* * * * *